United States Patent [19]

Lindgren

[11] Patent Number: 4,835,431
[45] Date of Patent: May 30, 1989

[54] TRANSFORMER AND SYNCHRONOUS MACHINE WITH STATIONARY FIELD WINDING

[76] Inventor: Theodore D. Lindgren, 6318 Cherry Hills Rd., Houston, Tex. 77069

[21] Appl. No.: 128,718

[22] Filed: Dec. 4, 1987

[51] Int. Cl.$^4$ .......................................... H02K 19/12
[52] U.S. Cl. ................................ 310/254; 310/165; 310/217; 336/132
[58] Field of Search ............ 310/105, 106, 190, 49 R, 310/91, 163, 164, 165, 217, 218, 254, 258, 261

[56] References Cited

U.S. PATENT DOCUMENTS

| | | | |
|---|---|---|---|
| 2,740,110 | 3/1956 | Trimble | 336/132 |
| 3,005,969 | 10/1961 | Wysocki | 336/134 |
| 4,404,559 | 9/1983 | Renner | 336/123 |
| 4,543,502 | 9/1985 | Jarret et al. | 310/217 |
| 4,714,854 | 12/1987 | Oudet | 310/268 |

FOREIGN PATENT DOCUMENTS 884850 8/1943 France ................................ 336/132

*Primary Examiner*—Patrick R. Salce
*Assistant Examiner*—D. L. Rebsch
*Attorney, Agent, or Firm*—Theodore D. Lindgren

[57] ABSTRACT

A multi-phase electrical transformer includes a rotor-stator structure that provides varying-reluctance magnetic-field paths in which the magnetic fields pass through plural stator cores on which phased primary and secondary windings are mounted and through a rotor that includes two annular poles attached to cylindrical pole-connecting means. At least one of the annular poles includes at least one field concentrator member. An optional stationary field winding surrounds the pole-connecting means in the region between said pole-connecting means and the stator cores, and permits adjustment of power factor in primary or secondary windings. The structure permits separation of stator core and pre-formed windings for repair and permits the core and windings to operate at cooler temperatures without additional cooling apparatus. The device of this invention is capable of simultaneous operation as a transformer and a synchronous machine.

10 Claims, 2 Drawing Sheets

TRANSFORMER AND SYNCHRONOUS MACHINE WITH STATIONARY FIELD WINDING

RELATED APPLICATIONS

This application is related to U.S. patent application Ser. No. 07/128,716, Brushless Alternator and Synchronous Motor With Optional Stationary Field Winding; to U.S. patent application Ser. No. 07/128,719, Dual-Rotor Induction Motor With Stationary Field Winding; and to U.S. patent application Ser. No. 07/128,717, Inductive Torque Transmitter With Stationary Field Winding; all of which were filed by the same inventor on the same date as this application.

BACKGROUND OF THE INVENTION

1. Field of the Invention

This invention is in the field of multi-phase, electrical-power transformer and synchronous machine structures, and in particular, transformer and machine structures that include a rotor with stationary excitation field winding for th translation of the magnitudes of alternating currents and voltages or for electromechanical energy conversion.

2. Description of the Prior Art

Conventional electrical transformer structures are of shell- or core-type construction with magnetic circuits composed of single large magnetic cores for each phase of voltage or current. Each core provides paths for substantially all of the magnetic flux linking both the primary and secondary windings. The magnetic flux reverses direction at every point in the transformer core, causing unnecessarily large hysteresis energy loss with each cycle through the major hysteresis loop of the magnetic materials of the cores. Conventional synchronous electrical machines do not have stationary field windings, and excitation is provided by permanent magnets or by rotating field windings energized through brushes or through induced currents in rotor circuitry.

Prior-art structures are generally difficult to maintain at adequately cool temperatures because of limited access for cooling of the inner portions of large cores that are surrounded by windings threaded through those cores. Repair or replacement of the threaded windings is difficult.

In addition, conventional transformer structures generally do not provide means for adjusting power factor in either the primary or the secondary windings.

BRIEF SUMMARY OF THE INVENTION

This invention discloses a multi-phase electrical transformer and synchronous machine including a rotor-stator structure having an optional stationary field winding that ma be used to adjust the power factor in either the primary or secondary winding. The disclosed structure provides varying-reluctance magnetic-field paths in which the magnetic fields pass through a plurality of stator cores on which phased primary and secondary windings are mounted and through a rotor that includes two poles members attached to a cylindrical pole-connecting means. At least one of the pole members includes field concentrators. The optional stationary field winding is mounted on the stator cores such that the field winding surrounds the pole-connecting means in the region between the stator cores and the pole-connecting means.

This invention provides a transformer structure that permits improved access for repair or replacement of electrical windings and that separates the stator core area into segments for improved cooling capability. In addition, the hysteresis losses of the structure are minimized through use of a design in which the time-varying magnetic fields may pass through the stator cores without reversing direction and, therefore, avoid increased losses caused by cycles through the major hysteresis loop of the laminated material used to construct the cores.

The structure of the device permits conductors of primary and secondary windings to be pre-wound for ease in assembly and in replacement. The pre-wound windings may be shaped such that the stator cores are threaded through the windings rather than the windings threaded through the stator cores, as in prior-art structure. The device of this invention is capable of simultaneous operation as a transformer and a synchronous machine.

DESCRIPTION OF THE PREFERRED EMBODIMENTS

Figure 1:
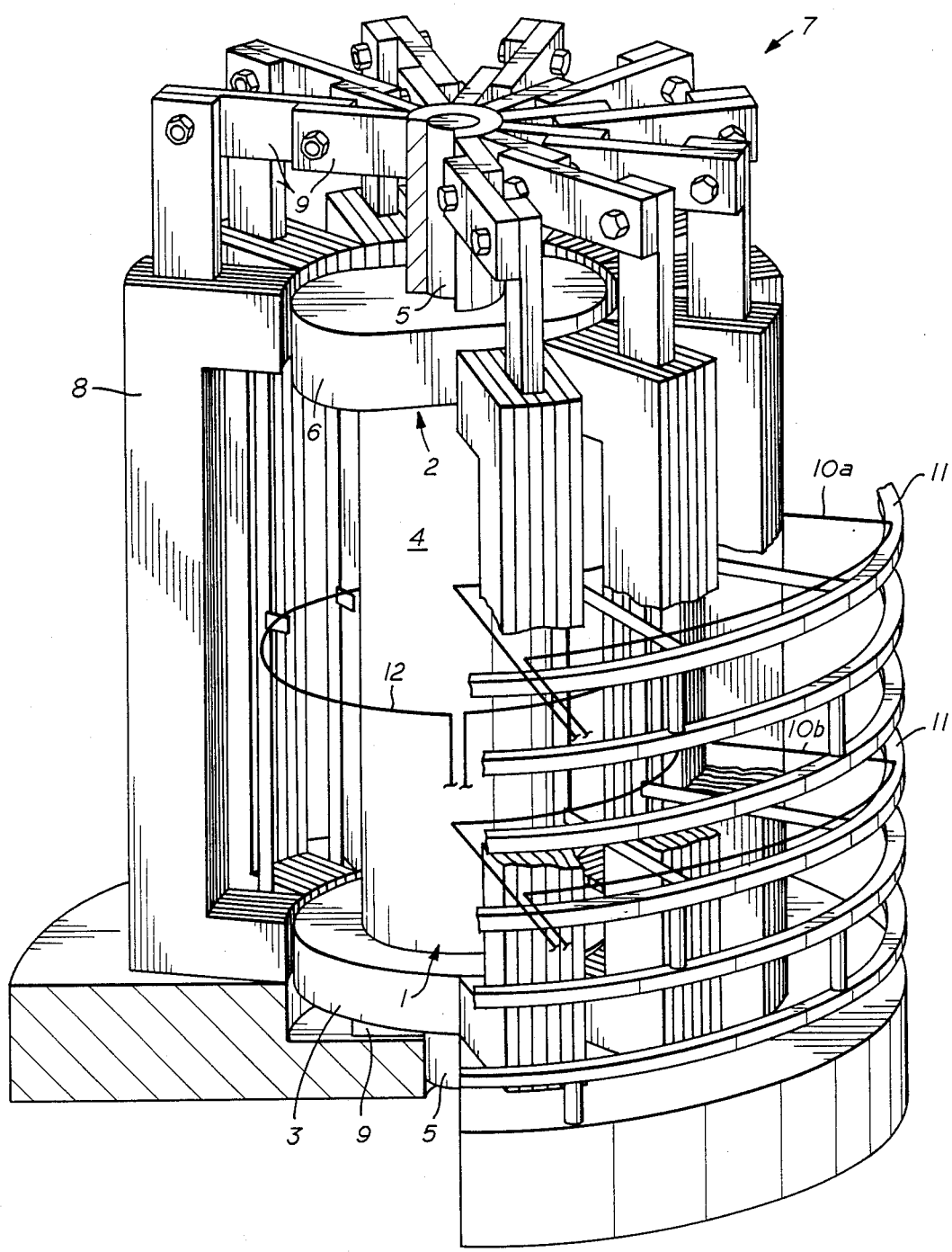
FIG. 1 depicts an embodiment of the structure of this invention.

Referring to FIG. 1, rotor 1 includes cylindrical pole members 2 and 3 concentrically attached to, or formed with, a cylindrical pole-connecting means 4 such that poles 2 and 3 extend radially outward from connector 4. Connector 4 is illustrated as a cylinder concentrically attached between pole members 2 and 3. Poles 2 and 3 and connector 4 are fabricated using material having relatively high magnetic permeability. Rotor positioning means 5 is illustrated as a shaft concentrically attached to, or formed with, pole members 2 and 3 and connector 4. Shaft 5 is illustrated as extending from both ends of rotor 1. Field concentrator members 6 are illustrated as forming the outer portion of poles 2. Either or both of poles 2 and 3 may be formed separately from connector 4.

Stator 7 includes a plurality of stator cores 8 positioned concentrically by stator positioning and structure means 9 and rotor positioning means 5 such that cores 8 extend between poles 2 and 3, including concentrators 6. As is well-known, stator positioning and structure means 9 and rotor positioning means 5 may be such that stator positioning and structure means 9 includes at least one shaft and such that rotor positioning means 5 has at least one hollow cylindrical journal part that meshes with that shaft. Cores 8 may include, as in prior-art transformers, layers of sheet steel separated by material having relatively high electrical resistivity. The sheet steel may be cut or stamped in C-shaped laminations that are aligned such that the ends of the upper and lower segments form a circular cylindrical surface at the air gaps adjacent to poles 2 and 3. The dimensions, shape and alignment of the upper and lower segments of each core 8, are such that, when attached to stator positioning means 9, the ends of the segments form two identical-diameter circular cylindrical surfaces at the air gaps adjacent to poles 2 and 3.

Primary and secondary windings 10a and 10b (hereinafter referred to collectively as windings 10), each illustrated with only one turn representing one phase, are positioned by winding support structure 11 with respect to core 8 such that induced voltages are in proper phase sequence and such that maximum electric field limitations are not exceeded. Windings 10 may be of insulated conductive or superconductive materials.

Optional field excitation is provided by stationary field winding 12, also illustrated with one turn. Winding 12 is positioned between cores 8 and connector 4 by winding support structure 11.

During operation of the device of FIG. 1, a direct current is applied to field winding 12 through ends which preferably extend through the same opening between two cores 8. When used as a transformer, primary and secondary windings 10a and 10b are connected to preferably phase-balanced, alternating-current energy sources and loads respectively. When used as an alternator or motor, at least one of windings 10a and 10b is connected to a phase-balanced load or source, respectively, and shaft 5 is attached to a mechanical energy source or load, respectively. The currents in field winding 13 and in windings 10 produce magnetic fields that extend through the paths consisting of poles 2 and 3, connector 4, cores 8 and the short air gaps between cores 8 and poles 2 and 3. The magnetic flux in stator core 8 is greater in those cores 8 adjacent to concentrators 6. As rotor 1 turns, the change in total magnetic flux passing through a stator winding 10 will be a maximum at the point in time that a rotating concentrator 6 is approximately centered with respect to a radial line defined by the common boundary of two adjacent stator cores 8 between which a conductor of the winding 10 passes. Similarly, the change in total magnetic flux is a minimum at the point in time that a rotating concentrator 7 is approximately centered between two such radial lines defined by the stator winding 10 or by an adjacent winding having the same phase assignment. The current in field winding 12 may be used to adjust the power factor in either primary or secondary windings 10 if the transformer structure is used with a large-capacity source of voltage. In other applications, the current in winding 12 may be used to adjust operating voltages or currents within limited ranges.

Field concentrators 6 of rotor 1 are indicated in FIG. 1 as being shaped with non-uniform-length air gaps. The shapes of concentrators 6 may, for example, be sinusoidal or half-sinusoidal with uniform air gaps. Concentrators 6 should generally be fabricated to produce an air-gap magnetic-flux distribution that is offset sinusoidal as a function of angle if the structure is to be used for the usual applications that require time-varying, single-frequency sinusoidal voltages and currents.

The number of concentrators 6 to be used depends, among other considerations, on the desired rotational speed of rotor 1. The ratio of rotational speed, measured in revolutions per minute, to frequency, measured in Hertz, is equal to sixty divided by the total number of concentrators 6 on a pole 2 or 3.

While concentrators 6 may be included in both poles 2 and 3, use of concentrators on only one such pole 2 or 3 is recommended because less restricted eddy current flow in the pole 2 or 3 lacking concentrators 6 will assist in causing rotor means 1 to reach synchronous speed during start-up. A separate electrical starting motor may be attached to rotor 1 for applications where the starting torque is large enough to require an additional source of rotational energy.

Operation of the transformer or machine will cause positively and negatively charged regions in the upper and lower portions of poles 2 and 3 and in the inner and outer portions of connector 4 because the magnetic fields associated with currents in stationary windings 10 and 12 do not rotate. For applications at usual rotational speeds, the electric fields associated with those charges may be ignored.

Stator cores 8 are preferably constructed to have the smallest cross-sectional area and length possible without causing the magnetic field density to exceed saturation limitation and without exceeding maximum electric field limitations for spacing and size of windings 10. For usual applications, stator cores 8 may be designed to minimize energy losses and yet provide a highly permeable path for magnetic fields through use of conventional layers of thin sheet steel or other magnetically permeable material coated with or separated by material having high electrical resistivity. The sheet steel should have minimal residual magnetism. The laminations indicated in FIG. 1 are planar in planes defined generally by the structure cylindrical-coordinate, radial-axial directions. The axial coordinate of the structure is defined to be the center of shaft 5.

Stator cores 8 are illustrated in FIG. 1 as being fabricated from sheet metal laminations stamped or otherwise formed in a rectangular C-shape. Cores 8 may be formed from sheet metal laminations with stacked ends formed in a semi-circular or other C-shape to provide greater space for windings 10. The upper and lower segments of the C-shape extend inward toward the air gaps and should join such that no gap exists between stator cores 8 at the air gaps in order to minimize energy losses in rotor means 1 and to provide a continuously uniform reluctance for the rotating magnetic-field-density magnitudes.

Because the radially extending laminated stator cores 8 have uniform width, the space between the outer segments of cores 8 increases with distance from the center of the structure, allowing space for windings 10.

Where more than one concentrator 6 is used, stator windings 10 should generally span one-half of the angular distance between identical points on adjacent concentrators 6. Windings 10 should, as a general rule, be consistently directed such that all of the balanced primary and secondary currents designated by phase as positive flow in either the clockwise or counterclockwise direction along the surfaces of stator cores 8 adjacent to connector 4. That general rule applies to two-phase transformers if those transformers are treated as having four phases.

While the illustration of primary and of secondary windings 10 is limited in FIG. 1, the number of turns actually used for windings 10 involves several factors, including the number of phases of and the absolute and relative magnitudes of operating voltages and currents, the number of stator cores 8, the maximum magnetic flux density and corresponding stator core 8 dimensions, and the conductivity of the winding material.

Figure 2:
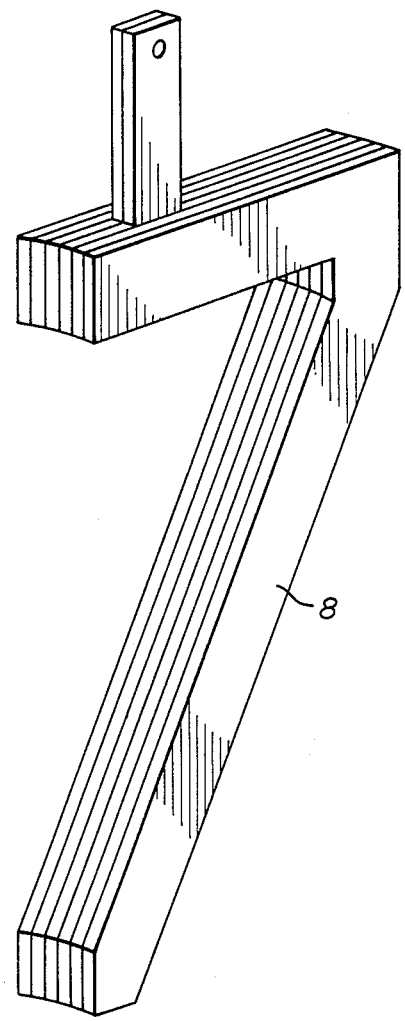
FIG. 2 depicts an optional form of stator core for use with the structure of this invention.

Windings 10 may be grouped by phase as indicated in FIG. 1 and may be formed such that the radial distance between inner and outer conductors is sufficient to allow removal of those stator cores 8 surrounded by a particular winding 10, thereby permitting assembly, removal and replacement of pre-formed windings 10 without need for threading conductors of those windings through stator cores 8. The distance between inner and outer conductors of pre-formed windings 1 must be greater than the radial distance between inner and outer surfaces of the removable stator cores 8 on which windings 10 are mounted. The alternate depiction of stator cores 8 illustrated in FIG. 2 permits windings 10 to have a shorter radial distance, while allowing greater spacing between high voltage conductors positioned in regions where separation between cores 8 is greater.

Alternatively, cores 8 may be composed of a ceramic-ferrous composition or similar magnetically permeable material.

Stator positioning means 9 and rotor positioning means 5 position stator cores 8 concentrically with respect to poles 2 and 3. Stator positioning means 9 and rotor positioning means 5 may be of disc, sleeve, ball, roller or other combinations and configurations known in the art. The structure of stator positioning means 9 as indicated in FIG. 1 must be composed at least in part of material with relatively low magnetic permeability to prevent magnetic flux from bypassing the air gaps between poles 2 and 3 and cores 8.

The embodiment described above and indicated in the drawings is illustrative and is not to be interpreted in a limiting sense. Many variations, modifications and substitutions may be made without departing from the scope of the claimed invention. Certain of those possible variations, modifications and improvements may be patentable, yet fall within the claims of this invention.

I claim:

1. An electrical transformer and synchronous machine structure including a rotor and a stator;
   wherein said rotor includes
   a pair of annular pole members,
   a cylindrical pole-connecting means to which said pole members are concentrically attached at the ends thereof, and
   a concentrically attached rotor positioning means;
   wherein said stator includes
   a plurality of C-shaped stator cores having generally uniform width and having upper and lower segments,
   at least one winding of a plurality of phased alternating-current windings mounted on said stator cores, and
   a concentrically attached stator positioning means for engaging said rotor positioning means;
   wherein the ends of the upper and lower segments of said stator cores form an upper circular cylindrical surface and a lower circular cylindrical surface;
   wherein at least one of said annular pole members includes at least one magnetic field concentrator member;
   wherein said rotor is rotatably and concentrically positioned with respect to said stator by said rotor positioning means and said stator positioning means such that an air gap is formed between each pole member and one of said upper and lower cylindrical surfaces;
   wherein said pole members, at least a portion of said pole-connecting means between said pole-members, and said stator cores include material having relatively high magnetic permeability.

2. The structure of claim 1 in which said stator further includes an attached stationary magnetic field winding, wherein said field winding surrounds said pole-connecting means and is positioned inside said C-shaped stator cores.

3. The structure of claim 1 in which said air gap between said concentrator member and said stator core is non-uniform in length.

4. The structure of claim 1 in which said air gap between said concentrator member and said stator core is non-uniform in length and the magnetic field density in said air gap is substantially an offset sinusoid as a function of angular distance around the circumference of said gap.

5. The structure of claim 1 in which said stator cores include laminated magnetically permeable material with the laminations separated by material having high electrical resistivity, said laminations being planar in planes generally defined by the structure cylindrical-coordinate, radial-axial directions.

6. The structure of claim 1 in which said stator core includes ferrous composite material.

7. The structure of claim 1 in which the segments of said alternating-current windings located adjacent to said pole-connecting means are directed such that balanced positive currents having three or more phases flow in only one of the clockwise or counterclockwise directions, wherein two-phase balanced currents shall be considered as having four phases.

8. The structure of claim 1 in which said pole-connecting means also includes a centrifugal fan means.

9. The structure of claim 1 in which the radial distance between inner and outer conductors of said alternating-current windings is greater than the radial distance between inner and outer surfaces of one of said stator cores.

10. The structure of claim 1 in which an electrical starting motor is attached to said rotor.

* * * * *